(12) United States Patent
Yamamoto et al.

(10) Patent No.: US 7,201,077 B2
(45) Date of Patent: Apr. 10, 2007

(54) AUTOMATIC TRANSMISSION SHIFT RANGE DISPLAY STRUCTURE

(75) Inventors: Hiroaki Yamamoto, Chigasaki (JP); Kenichi Kako, Aichi (JP)

(73) Assignee: Nissan Motor Co., Ltd., Yokohama (JP)

( * ) Notice: Subject to any disclaimer, the term of this patent is extended or adjusted under 35 U.S.C. 154(b) by 310 days.

(21) Appl. No.: 10/862,350

(22) Filed: Jun. 8, 2004

(65) Prior Publication Data

US 2005/0000310 A1 Jan. 6, 2005

(30) Foreign Application Priority Data

Jun. 9, 2003 (JP) ............... 2003-163578

(51) Int. Cl.
*B60K 20/04* (2006.01)
*F16H 63/42* (2006.01)

(52) U.S. Cl. ............... 74/437.18; 74/473.33; 116/28.1

(58) Field of Classification Search ............... 74/473.1, 74/473.18, 473.3, 471 XY; 116/28.1, 35 A, 116/321, 323
See application file for complete search history.

(56) References Cited

U.S. PATENT DOCUMENTS 5,845,535 A * 12/1998 Wakabayashi et al. ... 74/473.18
5,899,115 A * 5/1999 Kataumi et al. .......... 74/473.18
5,946,976 A * 9/1999 Miyoshi et al. .......... 74/473.18
6,044,790 A * 4/2000 Murakami ................. 116/28.1
6,080,083 A * 6/2000 Nishino ..................... 477/125
6,443,031 B1 * 9/2002 Kim ........................... 74/566
2001/0029799 A1 * 10/2001 Ohashi et al. .............. 74/335

FOREIGN PATENT DOCUMENTS

JP 11-78581 A 3/1999
JP 11-78581 A * 3/1999

* cited by examiner

*Primary Examiner*—Thomas R. Hannon
*Assistant Examiner*—Justin Krause
(74) *Attorney, Agent, or Firm*—Global IP Counselors

(57) ABSTRACT

An automatic transmission shift range display structure is configured to make it possible to visually confirm that an automatic shift lever with a manual mode is in the manual mode. The automatic transmission shift range display structure has a shift lever with a range display. The shift lever is moveable in the lengthwise direction of the vehicle to select a D range of the automatic mode, and moveable in the widthwise direction of the vehicle from the automatic mode to select a manual mode. A slide member operates in coordination with the movement of the shift lever, and includes a slide indicator for identifying whether the shift lever is in the automatic mode or the manual mode. The range display has an indicator upper member with one or more transparent windows through which indicator is visible such that the selection of the automatic mode and the manual mode can be visually confirmed.

11 Claims, 11 Drawing Sheets

AUTOMATIC TRANSMISSION SHIFT RANGE DISPLAY STRUCTURE

BACKGROUND OF THE INVENTION

1. Field of the Invention

The present invention generally relates to an automatic transmission shifting device with a range display for an automatic transmission.

2. Background Information

Typically, automotive vehicles having an automatic transmission have a shifter for selecting a gear position such as a park position "P", a reverse position "R", a neutral position "N" and a drive position "D". However, more recently, vehicles with automatic transmissions have been developed that allow the driver to manually change the gear ratio of the transmission. A variety of shifting arrangements have been developed to accomplish both the automatic shift mode and the manual shift mode. One of the most common methods is to utilize a shifter with a shift lever that has an automatic shifting path and a manual shifting path. One example of such a shifting arrangement is disclosed in U.S. Pat. No. 6,080,083. In this shifting arrangement, the shift lever is moved in a lateral direction when a manual shift mode is desired. After the shift lever is moved in a lateral direction, the shift lever can be moved in either a forward or rearward direction for upshifting or downshifting the gear ratio of the transmission Another similar shifting arrangement is disclosed in Japanese Laid-Open Publication No. 11-78581, in which the shifting arrangement has a range display device for the automatic transmission of an automobile. The shift lever of this shifting arrangement is a shift lever having an automatic drive mode (D mode) and a manual mode (M mode). A housing upper is provided at the base of the shift lever, and a display plate for showing the gear position such as a park position "P", a reverse position "R", a neutral position "N", a drive position "D", a manual position "M" and other gear positions. The display plate is provided with a display for showing the positions of the shift lever, and a transparent window formed to the side of the display. An opening that allows the shift lever to slide in the lengthwise direction of the vehicle is formed in the housing upper. A first cover slide member that covers the opening and is capable of operating in coordination with the sliding movement of the shift lever in the lengthwise direction of the vehicle is provided under the housing upper. Also a second cover slide member is positioned under the first cover slide member and is movable in the lengthwise and crosswise directions of the vehicle. The shift lever passes completely through the cover slide members. An indicator extending below the transparent window is disposed in the cover slide member. The indicator is visible from the transparent window. A shield that comes between the indicator and the transparent window when the shift lever changes from the D mode to the M mode is formed on the cover slide member.

In view of the above, it will be apparent to those skilled in the art from this disclosure that there exists a need for an improved automatic transmission shift range display structure. This invention addresses this need in the art as well as other needs, which will become apparent to those skilled in the art from this disclosure.

SUMMARY OF THE INVENTION

It has been discovered that the indicator of the Japanese publication, mentioned above, is obtained by affixing red marks to the first cover slide member that moves in the lengthwise direction of the vehicle in coordination with the sliding movement of the shift lever in the lengthwise direction. However, there is a drawback in that because the indicator in the D mode is merely hidden when a switch has been made to the manual or M mode, the fact that the system is in the M mode when a switch has been made to the manual mode cannot be displayed.

The present invention was contrived in view of the foregoing drawback. One object of the present invention is lo provide a display that the range display device of an automatic transmission with a manual mode is in the manual mode.

To solve above-mentioned problems, an automatic transmission shift range display structure is provided that basically comprises a range display, a shift lever and a slide member. The shift lever is configured to be selectively moved in a lengthwise direction of a vehicle relative to the range display to select a plurality of predetermined positions of an automatic mode and is further configured to be selectively moved in a widthwise direction of the vehicle relative to the range display from the automatic mode to select a manual mode that is positioned in the crosswise direction of the vehicle at one of the predetermined positions. The slide member is configured to operate in coordination with the movement of the shift lever. The slide member includes an indicator configured to identify a current location of the shift lever corresponding to the predetermined positions of the automatic mode and the manual mode by selectively displaying the current location on the range display.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
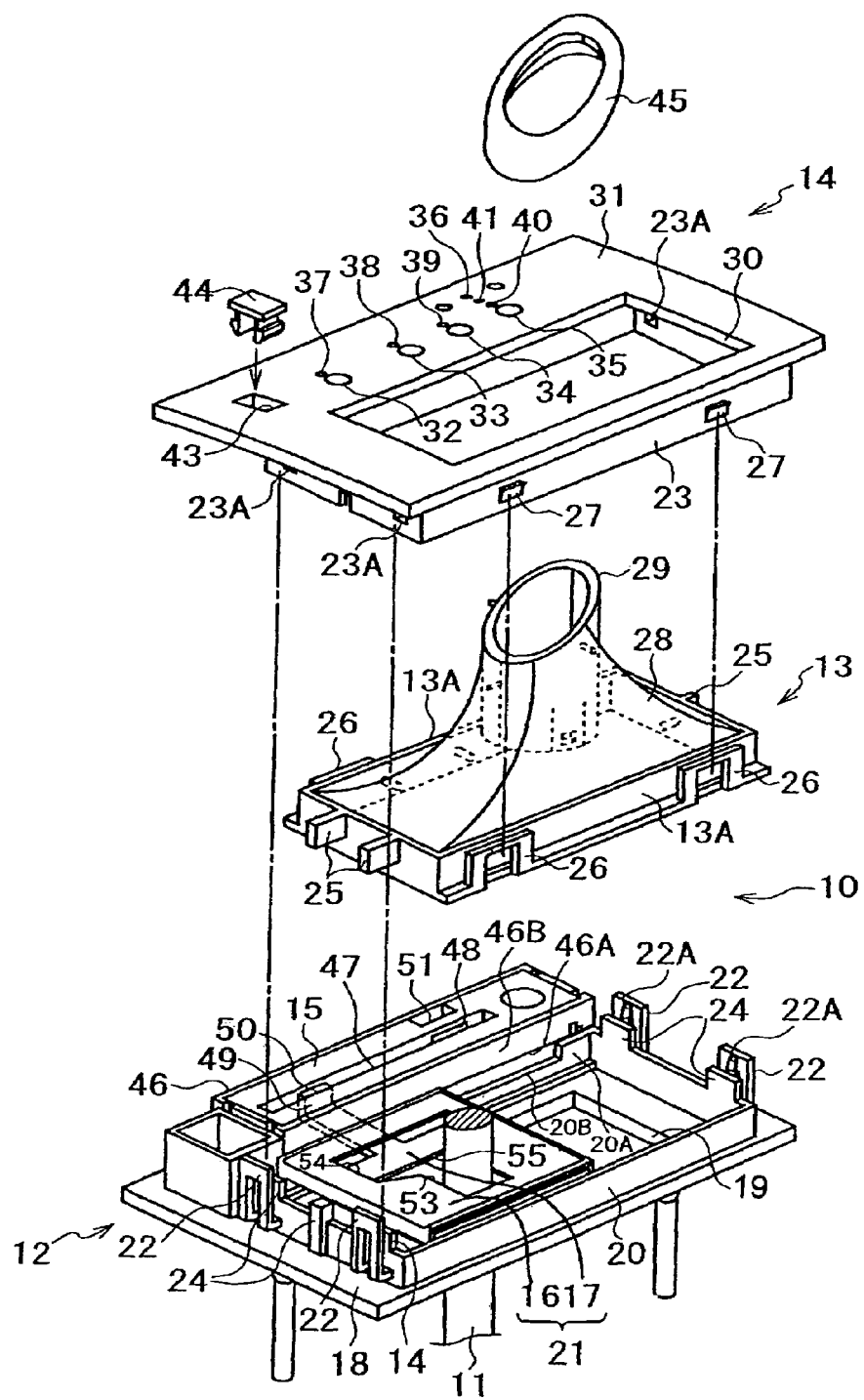
FIG. 1 is an exploded perspective view a shifting arrangement or device having an automatic transmission shift indicating device in accordance with one embodiment of the present invention.
Figure 2:
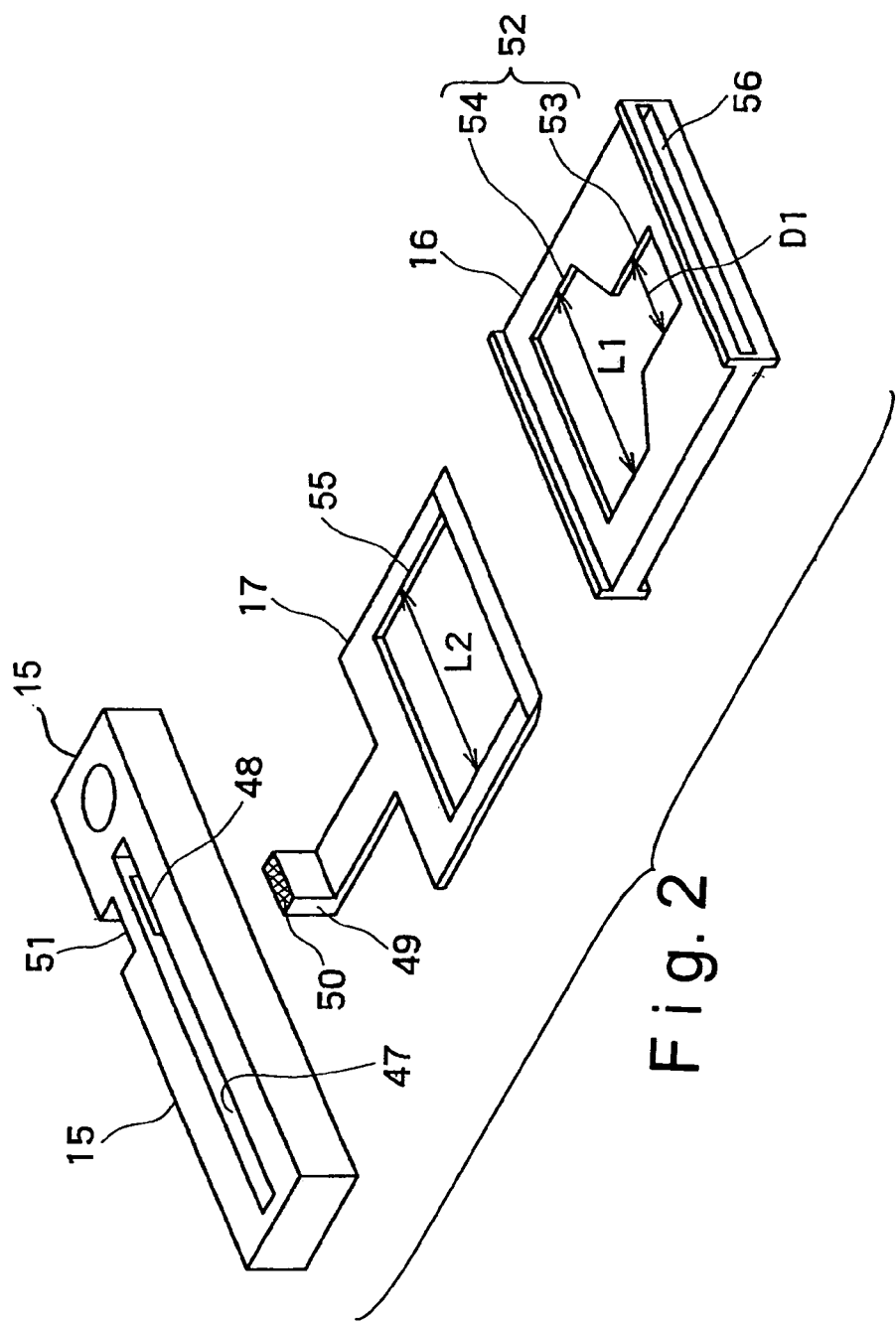
FIG. 2 is an exploded perspective view of a slide member comprising first and second slide plates, and a guide member in accordance with one embodiment of the present invention.

Referring initially to FIGS. 1 and 2, a shifting arrangement or device is illustrated having an automatic transmission shift indicating device 10 in accordance with one embodiment of the present invention. In particular, FIG. 1 shows an exploded perspective view of the basic structure of the shifting arrangement or device with the automatic transmission shift indicating device 10 having a shift lever 11, an indicator base member 12, an inner frame member 13 and an indicator upper member 14, while FIG. 2 shows a guide member 15, a first slide plate 16 and a second slide plate 17 that are combined to form a slide member 21.

The shift lever 11 is configured and arranged for operating the ranges of the automatic transmission (not depicted). The indicator base member 12 is mounted on the floor console of the floor panel in the vicinity of the driver seat. The inner frame member 13 is movably mounted between the indicator base member 12 and the indicator upper member 14. The indicator upper member 14 serves as a gear position or range display. The guide member 15 serves as an indicator character illumination member.

An opening 19 is formed in the flat plate 18 of the indicator base member 12 that allows the shift lever 11 to move. A frame-shaped portion 20 is peripherally formed around the opening 19 that stands erect from the flat plate 18. The slide member 21, which is a combination of the first slide plate 16 and the second slide plate 17, is disposed in the interior of this frame-shaped portion 20 in a manner that allows sliding contact in the lengthwise direction of the vehicle. Several latches 22 are formed in a protruding manner on the front and back edges of the frame-shaped portion 20, respectively. The latches 22 are provided with hook projections 22A on the internal side of the latches 22 that latch together with the engaging holes 23A formed in a frame-shaped portion 23 that protrudes from the lower surface of the indicator upper member 14.

The inner frame member 13 has an enclosure shape that is mounted between the indicator base member 12 and the indicator upper member 14. The inner frame member 13 is mounted on the left and right edges of the frame-shaped portion 20 as well as between the front and rear projections 24 of the frame-shaped portion 20. The inner frame member 13 has front and rear projections 25 that are supported on the front and rear edges of the frame-shaped portion 20. Furthermore, two latches 26 are formed in the left and right side walls 13A of the inner frame member 13. The frame-shaped portion 23 of the indicator upper member 14 is inserted and held between the latches 26 and the side walls 13A. In particular, hook projections 27 are formed on the frame-shaped portion 23 of the indicator upper member 14. The hook projections 27 are latched to the latch holes of the latches 26. Thus, the inner frame member 13 is sandwiched between the indicator base member 12 and the indicator upper member 14.

The inner frame member 13 further includes a boot 28 that is configured and arranged on the inner frame member 13 for allowing the shift lever 11 to tilt in the lengthwise direction of the vehicle and the crosswise direction of the vehicle. The upper end of the boot 28 has a cylindrically-shaped portion 29 through which the shift level 11 is inserted.

Figure 4:
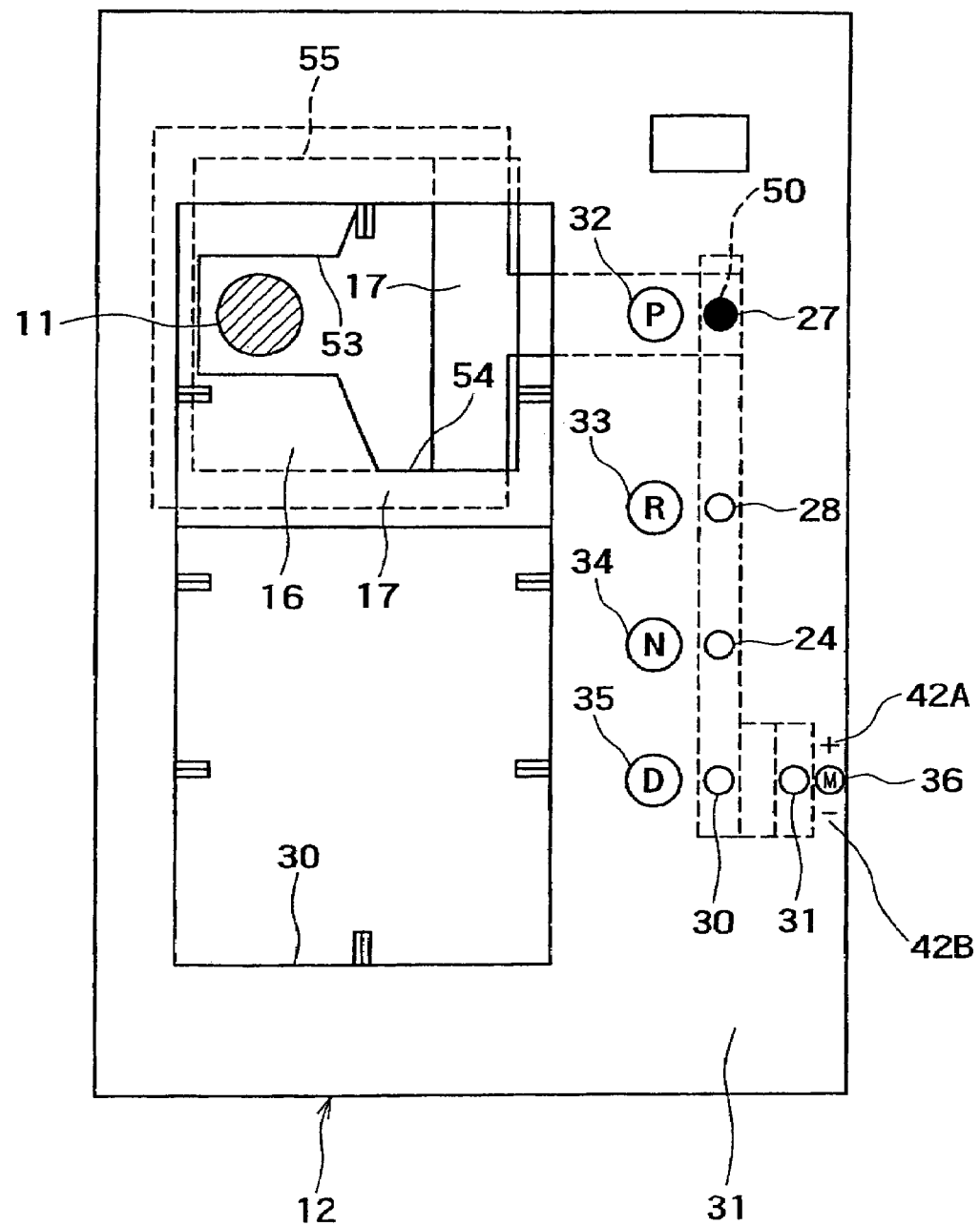
FIG. 4 is a top plan view of the automatic transmission shift indicating device in which the slide member is in the P position of the automatic drive mode (D mode)
Figure 5:
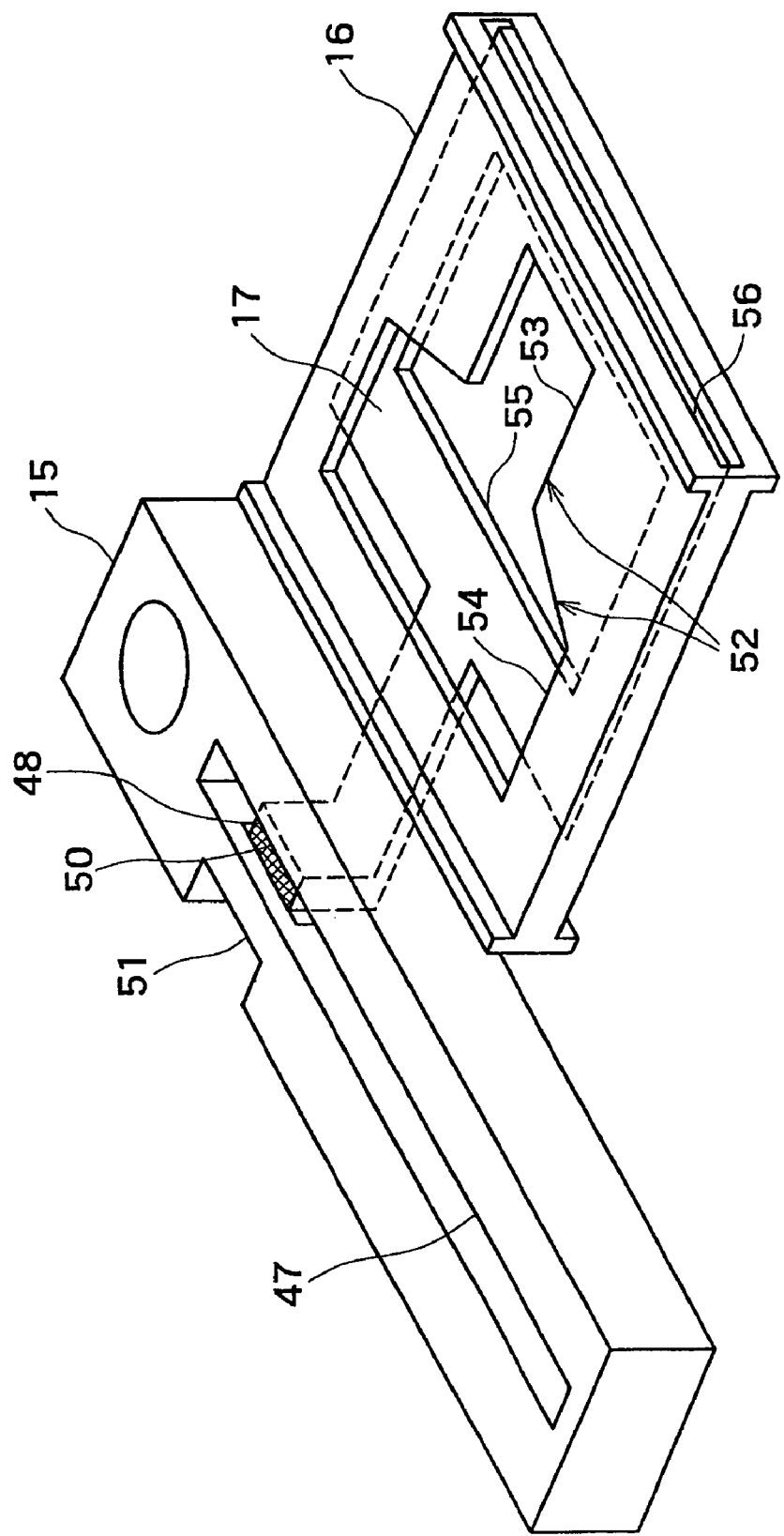
FIG. 5 is a perspective view of the slide member, similar to FIG. 3, but in which the slide member is in the D position of the automatic drive mode (D mode)
Figure 6:
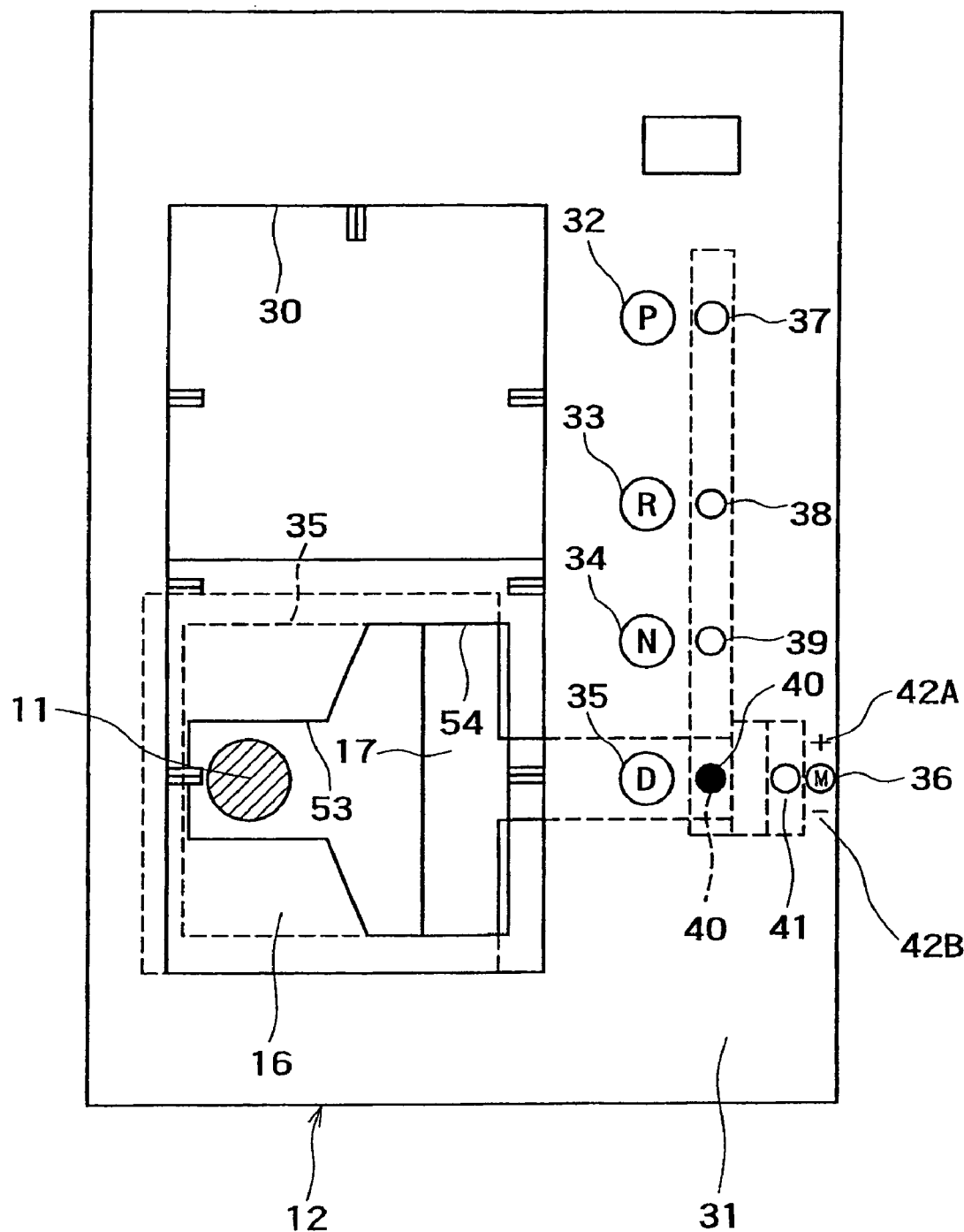
FIG. 6 is a top plan view of the automatic transmission shift indicating device, similar to FIG. 4, but in which the slide member is in the D position of the automatic drive mode (D mode)

The indicator upper member 14 has an opening 30 through which the boot 28 extends through the indicator upper member 14. The opening 30 has a rectangular shape that expands in the lengthwise direction of the vehicle and the crosswise direction of the vehicle. The indicator upper member 14 has gear identification indicia such as characters that show the P position or range 32, the R position or range 33, the N position or range 34, the D position or range 35, and the manual position or range 36 of the shift lever 11. Thus, the gear positions are displayed in the upper plate 31 on the driver seat side of the opening 30. Transparent windows 37 to 40 are formed adjacent to these range positions 32 to 35, respectively. A transparent window 41 (a portion of the identification structure) is formed in the vicinity of the manual position or range 36. Marks 42A and 42B (refer to FIGS. 4, 6, and 8) showing "+" and "-" that are arranged in the lengthwise directions of the vehicle, are provided in the vicinity of the transparent window 41 of the manual position or range 36. The upper plate 31 has a component mounting hole 43, which is closed with a cap 44 in this embodiment. A ring 45 is provided on the upper portion of the shift lever 11. An L position or range can be provided to rearward side of the D position or range 35.

A retaining frame 46 is formed on the driver seat side of the frame-shaped portion 20 of the indicator base member 12. The guide member 15 is fitted into the interior of the retaining frame 46. A pathway 46A is formed in the vertical wall portion 46B of the retaining frame 46 on the side of the frame-shaped portion 20 for allowing the second slide plate 17 to move. The guide member 15 is provided with a long, thin guide hole 47 oriented in the lengthwise direction of the vehicle, and the automatic drive mode (D mode) is set in the guide hole 47 toward the rear of the vehicle.

Figure 3:
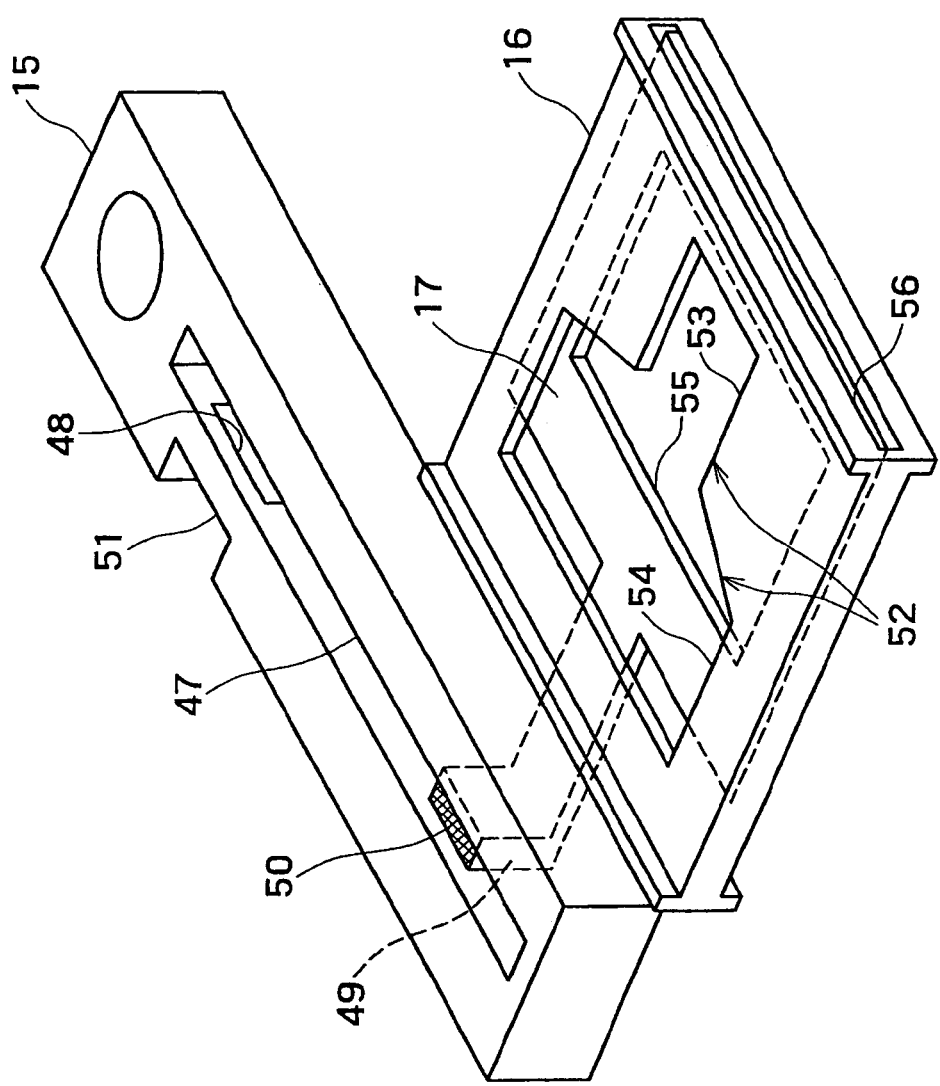
FIG. 3 is a perspective view of the slide member illustrated in FIG. 2 in which the slide member is in the P position of the automatic drive mode (D mode)

As best seen in FIGS. 2 and 3, a through-hole 48 extending in the cross-sectional direction of the guide hole 47 is formed in the guide hole 47 toward the rear of the vehicle. A slide projection 49 of the second slide plate 17 is designed to pass through interior of this through-hole 48. A red mark 50 (a portion of the identification structure) is, for example, displayed on the upper surface of the slide projection 49 of the second slide plate 17. Thus, the identification structure is preferably includes the mark 50 and the transparent window 41. A positioning hole 51 is located in a recessed portion of the through-hole 48. The positioning hole 51 has a size sufficient to house the slide projection 49, is provided to the reverse side of the guide hole 47. This positioning hole 51 forms a restricting device for restricting the movement of the slide projection 49 in the lengthwise direction of the vehicle, which the shift lever 11 is in the manual mode.

A long, thin pathway 20B is formed in the vertical wall portion 20A in the vicinity of the retaining frame 46 in the frame-shaped portion 20 of the indicator base member 12 for accommodating the sliding movement of the second slide plate 17. The sliding movement of the slide plate 17 is accommodated between the pathway 20B and the pathway 46A of the retaining frame 46. The slide projection 49 of the second slide plate 17 is inserted into the guide hole 47 before the retaining frame 46 is attached and fixed to the indicator base member 12. When the retaining frame 46 is fixed to the indicator base member 12, the slide projection 49 of the second slide plate 17 is provided in a manner that allows back and forth movement between the pathway 20B of the retaining frame 20 and the pathway 46A of the retaining frame 46.

The first slide plate 16 of the slide member 21 is provided with a first opening 52 for accommodating the shift lever 11, as shown in FIG. 2. The first opening 52 has a manual operating area 54 and an automatic operating area 53. The automatic operating area 53 has a width D1 in the lengthwise direction that is substantially the same as the width of the shift lever 11 in the lengthwise direction. The manual operating area 54 is contiguously formed with the automatic operating area 53, and has a width L1 in the lengthwise direction of the vehicle that is greater than the movement distance of the shift lever 11 in the lengthwise direction in the manual mode.

The second slide plate 17 overlaps the first opening 52, and has a second opening 55 for accommodating the shift lever 11. This second opening 55 serves as the manual operating area that has a width L2 in the lengthwise direction of the vehicle that is greater than the movement distance of the shift lever 11 in the lengthwise direction in the manual mode.

A retaining opening 56 is formed on the left and right edge portions of the first slide plate 16. A groove is formed on the internal side of each of the front and rear edge portions of the first slide plate 16. The second slide plate 17 is retained in place by the retaining opening 56, and slides back and forth in the widthwise direction of the vehicle via the grooves of the first slide plate 16. The second opening 55 and first opening 52 are mounted in a vertically overlapping manner, such that the first opening 52 and the second opening 55 both accommodate the shift lever 11.

In the range display device for an automatic transmission of the above-described embodiment, the shift lever 11 is capable of moving in the lengthwise direction of the vehicle, moving in the crosswise direction of the vehicle from the D position or range 35, which is a driving range of the automatic mode, and selecting the range of the manual mode (manual position or range 36). The manual position or range 36 is displayed next to the D position or range of the shift lever 11. The slide member 21 operates in coordination with the movement of the shift lever 11. The slide projection 49 is provided to the slide member 21 for identifying whether the shift lever 11 is in a range of the automatic mode or manual mode. The transparent window 41 is provided to the indicator upper member 14 through which the position of the mark 50 in the D position or range 35 of the automatic mode and the position of the mark 50 in the manual position or range 36 can be visually confirmed.

Figure 9:
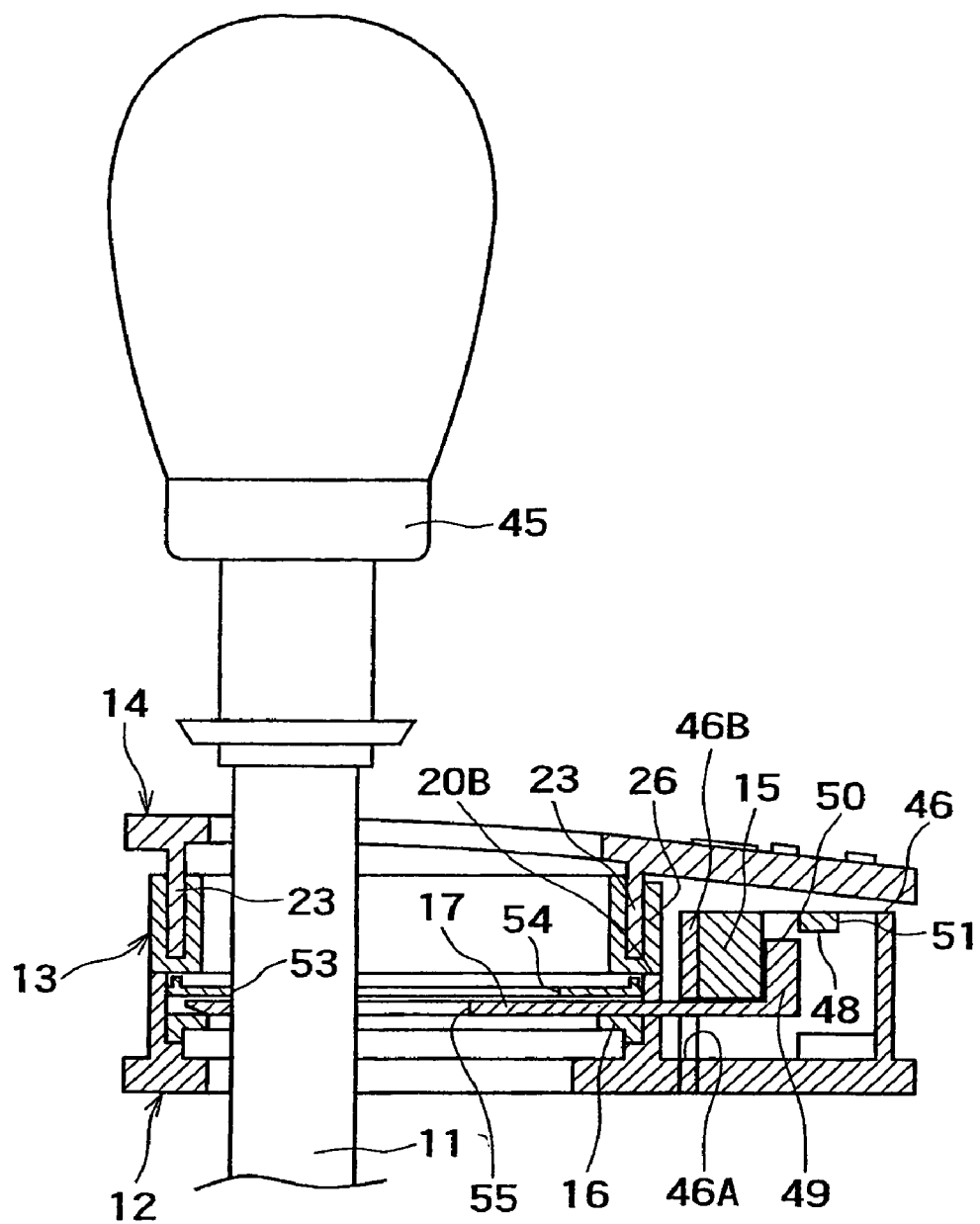
FIG. 9 is a schematic transverse cross sectional view of shifting arrangement or device with the shift lever in the automatic drive mode (D mode) as viewed from the rear of the vehicle and looking in a forward direction of the vehicle.
Figure 10:
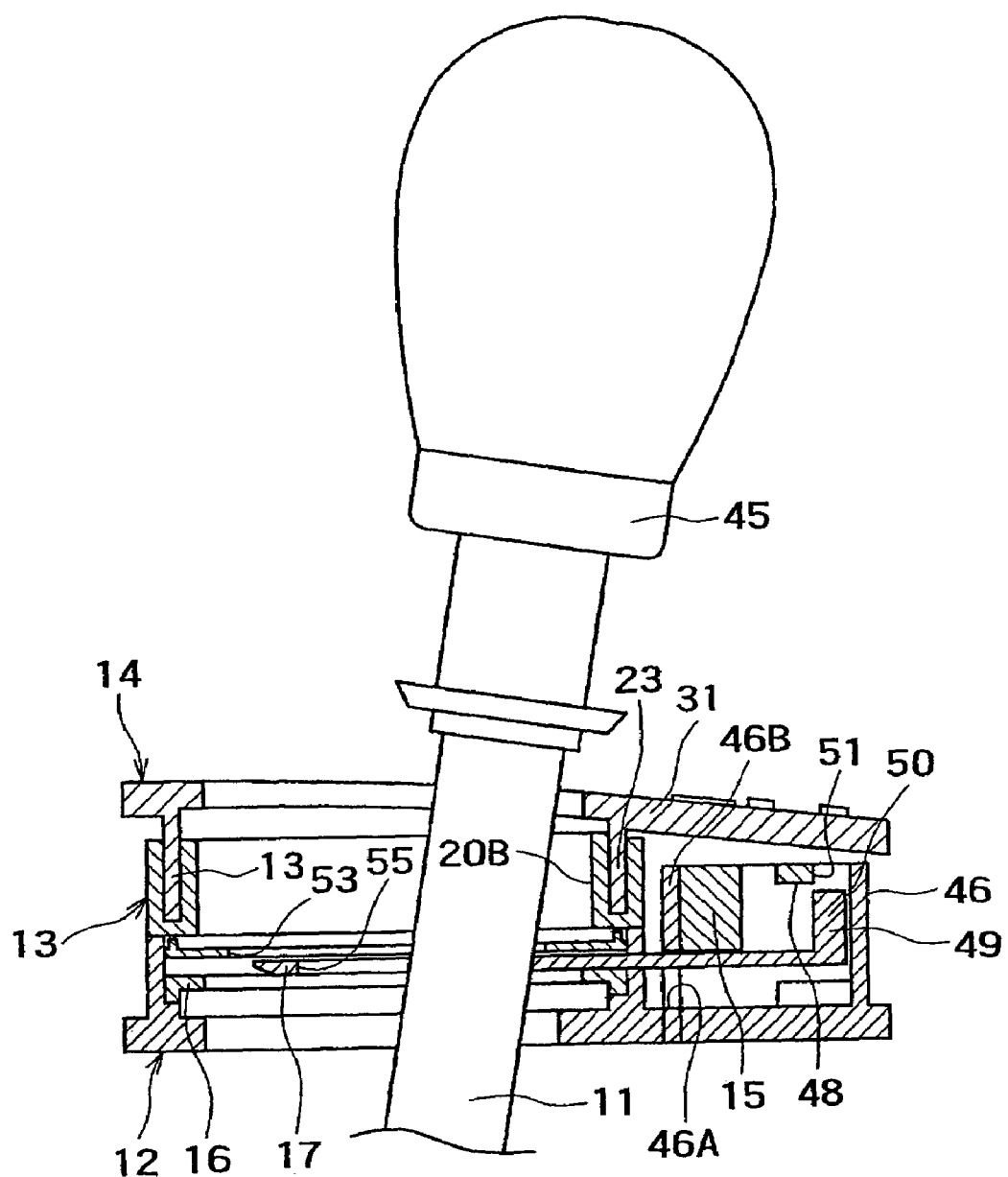
FIG. 10 is a schematic transverse cross sectional view of shifting arrangement or device, similar to FIG. 9, but with shift lever in the manual mode (M mode) as viewed from the rear of the vehicle and looking in a forward direction of the vehicle.
Figure 11:
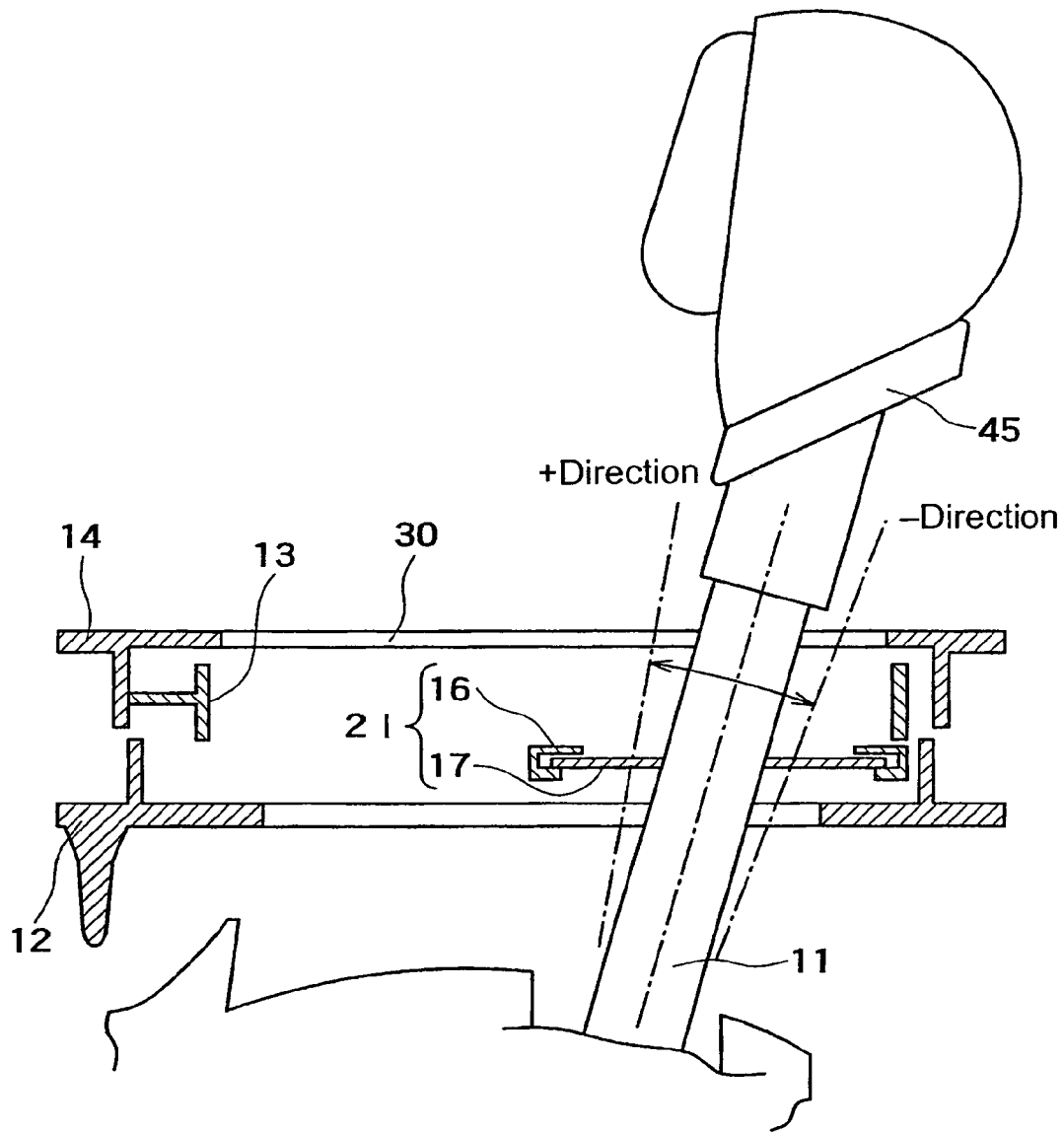
FIG. 11 is a schematic longitudinal cross sectional view of shifting arrangement or device with the shift lever in the automatic drive mode (D mode) as viewed from the side of the vehicle.

In the range display device for an automatic transmission of the above-described embodiment, the shift lever 11 is positioned in the automatic operating area 53 of the first slide plate 16 when the system is in the automatic mode shown in FIGS. 3 to 6. In an automatic mode operation, the first slide plate 16 is moved in the lengthwise direction in conjunction with the second slide plate 17 in accordance with the operation of the shift lever 11 (refer to FIG. 9).

At that time, the mark 50 formed on the second slide plate 17 slides within the guide hole 47 of the guide member 15. When the shift lever 11 selects any of the ranges or positions, e.g., P position or range 32, R position or range 33, N position or range 34, or D position or range 35, the mark 50 can be visually confirmed through the transparent windows 37 to 40.

The width D1 of the automatic operating area 53 is substantially the same as the width in the lengthwise direction of the shift lever 11, so the first slide plate 16 moves in conjunction with the second slide plate 17 as the shift lever 11 is moved in the lengthwise direction when in the system is in the automatic mode. The slide projection 49 of the second slide plate 17 is integrally formed with the second slide plate 17, so the mark 50 of the slide projection 49 can be visually confirmed through the transparent windows 37 to 40 in the range position in which the shift lever 11 has stopped. Hence, the driver can visually confirm the range position of the automatic mode.

Figure 7:
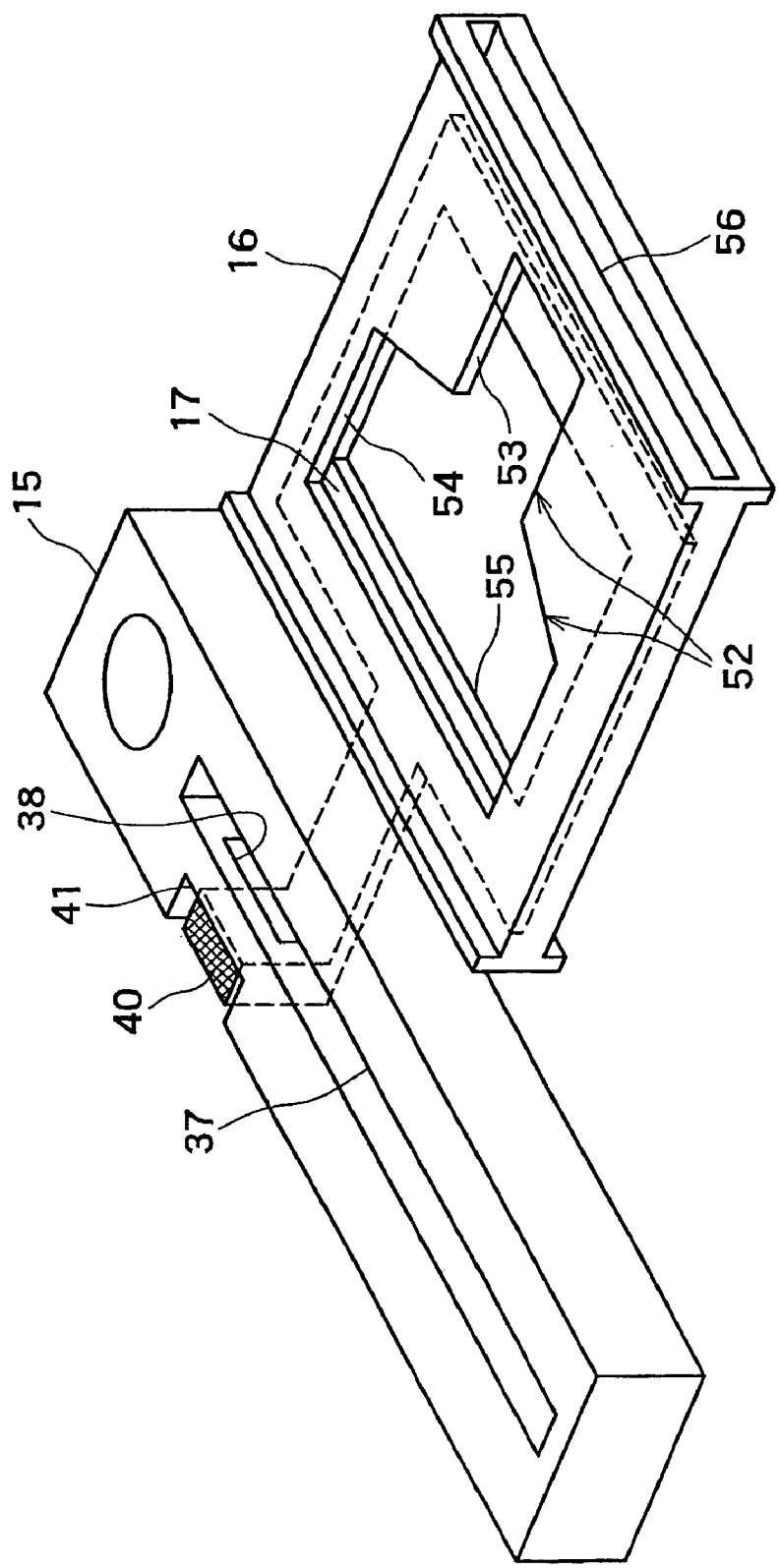
FIG. 7 is a perspective view of the slide member, similar to FIGS. 3 and 5, but in which the slide member is in the M position of the manual mode (M mode)
Figure 8:
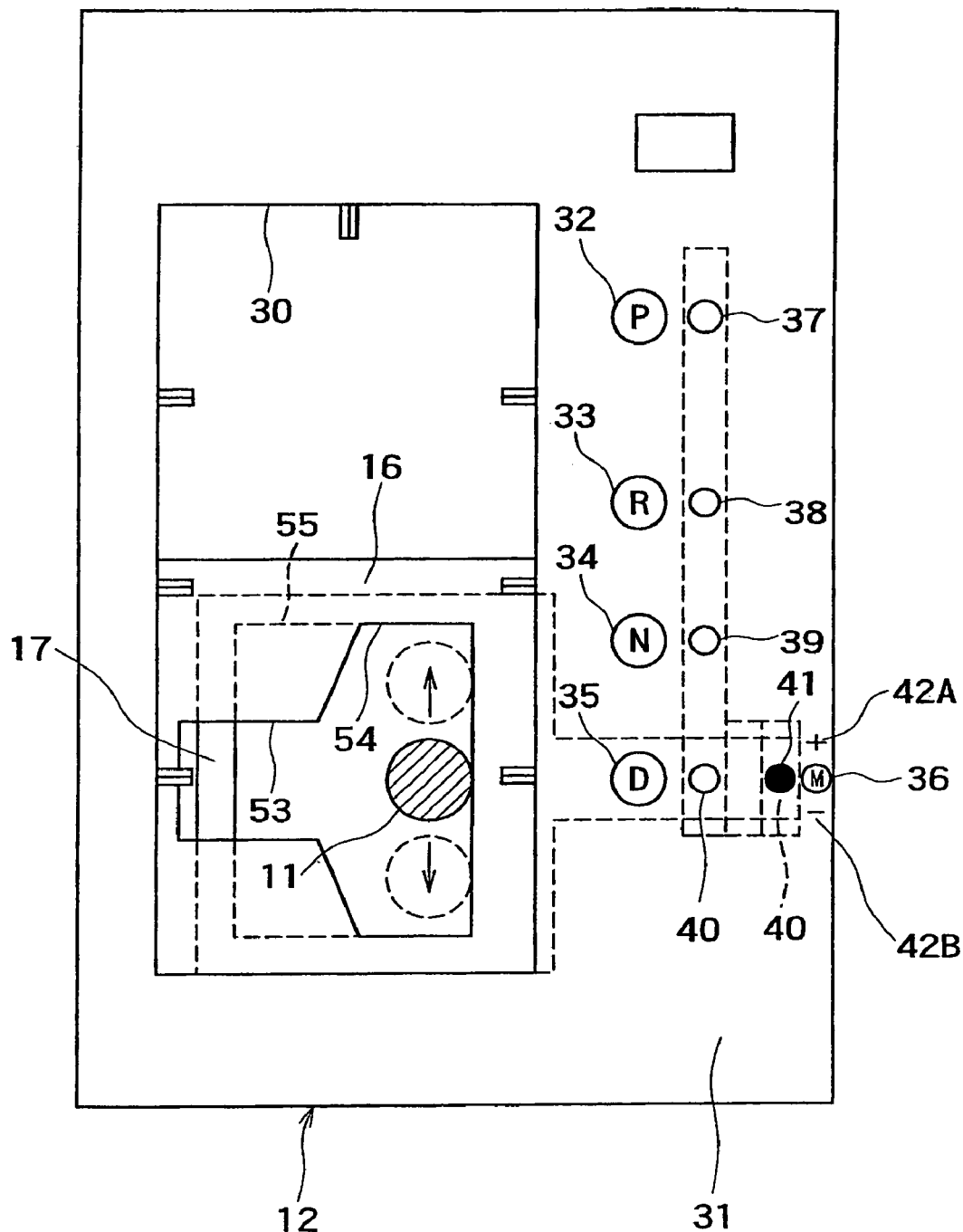
FIG. 8 is a top plan view of the automatic transmission shift indicating device; similar to FIGS. 4 and 6, but in which the slide member is in the M position of the manual mode (M mode)

Also, the second slide plate 17 is held by the first slide plate 16, so when the first slide plate 16 moves in the lengthwise direction of the vehicle and is positioned in the D position or range 35 of the automatic drive mode, the second slide plate 17 can be moved in the crosswise direction and set in the manual drive mode, as shown in FIG. 2. In other words, the shift lever 11 can be moved to the position of the manual range 36 from the D position or range of the automatic mode in the crosswise direction of the car, and when the shift lever 11 is moved to the manual position or range 36, the mark 50 can be visually confirmed through the transparent window 41, as shown in FIGS. 7 and 8.

The manual operating area 53 of the first opening 52 has a width L1 in the lengthwise direction that is greater than the movement distance of the shift lever 11 in the lengthwise direction, and the width L2 of the second opening 55 in the lengthwise direction of the car is set so as to be greater than the movement distance of the shift lever 11 in the lengthwise direction in the manual mode, so even if the shift lever 11 is moved slightly forward or backward in the lengthwise direction of the vehicle in order to change the gear ratio in the manual mode, this movement can be offset.

When the shift lever 11 is in the D position or range 35 of the automatic mode, the shift lever 11 is positioned in the automatic operating area 53 of the first slide plate 16 and in the second opening 55 of the second slide plate 17. Thus, the automatic operating mode 53 of the first slide plate 16 is formed in continuation with the manual operating area 54, and the slide projection 49 of the second slide plate 17 is positioned alongside the through-hole 48, as shown in FIGS. 7 and 8.

The through-hole 48 has a size that is sufficient to accommodate the slide projection 49, so when the shift lever 11 is moved from the position of the D position or range 35 to the manual position or range 36, the slide projection 49 moves through the through-hole 48 to the positioning hole 51. The positioning hole 51 is substantially equal to the width in the lengthwise direction of the slide projection 49, the slide projection 49 can smoothly pass therethrough, and the wall surface in the lengthwise direction of the positioning hole 51 restricts the movement of the slide projection 49 in the lengthwise direction of the vehicle, so the slide projection 49 is held in the lengthwise direction of the vehicle and the mark 50 does not shift in the lengthwise direction of the vehicle due to rocking or other action of the vehicle even in the manual mode.

On the other hand, the width L1 in the lengthwise direction of the manual operating area 54 and the width L2 in the lengthwise direction of the second opening 55 are set so as to be greater than the width of the shift lever 11 in the lengthwise direction, and a gap is set in the lengthwise direction of the vehicle between the shift lever 11 and the first and second slide plates 16 and 17.

The movement of the shift lever 11 in the lengthwise direction of the vehicle is thereby offset, and the range display can be kept in the manual mode even if the shift lever 11 is operated in the "+" direction (forward direction of the vehicle) or in the "−" direction (rearward direction of the vehicle) to increase ("+") or decrease ("−") the gear ratio in the manual mode. Therefore, even if the gear ratio changes, the mark 50 can be visually confirmed through the transparent window 41, and the driver can easily confirm that the system is in the manual mode.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-163578. The entire disclosure of Japanese Patent Application No. 2003-163578 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An automatic transmission shift range display structure comprising:
    a range display;
    a shift lever selectively movable in a lengthwise direction of a vehicle relative to the range display to select a plurality of predetermined positions of an automatic mode and further selectively movable in a widthwise direction of the vehicle relative to the range display from the automatic mode to select a manual mode that is positioned in the widthwise direction of the vehicle at one of the predetermined positions; and
    a slide member operable in coordination with the movement of the shift lever, and the slide member including an indicator identifying a current location of the shift lever corresponding to the predetermined positions of the automatic mode and the manual mode by selectively changing a state of a portion of the range display that corresponds to the current location of the shift lever, and the indicator further moves in the widthwise direction between an automatic mode position and a manual mode position so that the indicator is visible both in the automatic mode and in the manual mode.

2. The automatic transmission shift range display structure according to claim 1, further comprising
    a restricting device configured to restrict movement of the slide member in the lengthwise direction of the vehicle when the shift lever is in a range of the manual mode.

3. The automatic transmission shift range display structure according to claim 2, wherein
    the slide member includes a first slide plate configured to slide in the lengthwise direction of the vehicle in response to lengthwise movement of the shift lever, and a second slide plate being retained by the first slide plate to slide in the widthwise direction of the vehicle.

4. The automatic transmission shift range display structure according to claim 3, wherein
    the first slide plate comprises a first opening having an automatic operating area and a manual operating area that are configured and arranged to accommodate the shift lever; the automatic operating area having a width dimension as measured in the lengthwise direction of the vehicle that is substantially equal to a width dimension of a portion of the shift lever disposed in the first opening as measured in the lengthwise direction of the vehicle, and the manual operating area having a width dimension as measured in the lengthwise direction of the vehicle that is greater than the lengthwise movement of the shift lever in the manual mode; and
    the second slide plate has a second opening overlapping the first opening and accommodating the shift lever therein, the second opening having a width dimension as measured in the lengthwise direction of the vehicle that is greater than the lengthwise movement of the shift lever in the manual mode.

5. The automatic transmission shift range display structure according to claim 1, wherein
    the slide member includes a first slide plate configured to slide in the lengthwise direction of the vehicle in response to lengthwise movement of the shift lever, and a second slide plate being retained by the first slide plate to slide in the widthwise direction of the vehicle.

6. The automatic transmission shift range display structure according to claim 5, wherein
    the first slide plate comprises a first opening having an automatic operating area and a manual operating area that are configured and arranged to accommodate the shift lever; the automatic operating area having a width dimension as measured in the lengthwise direction of the vehicle that is substantially equal to a width dimension of a portion of the shift lever disposed in the first opening as measured in the lengthwise direction of the vehicle, and the manual operating area having a width dimension as measured in the lengthwise direction of the vehicle that is greater than the lengthwise movement of the shift lever in the manual mode; and
    the second slide plate has a second opening overlapping the first opening and accommodating the shift lever therein, the second opening having a width dimension as measured in the lengthwise direction of the vehicle that is greater than the lengthwise movement of the shift lever in the manual mode.

7. The automatic transmission shift range display structure according to claim 1, wherein
the range display includes an indicator upper member having at least one window through which the indicator is visible.

8. The automatic transmission shift range display structure according to claim 7, wherein
the indicator upper member includes indicia disposed adjacent the least one window that is indicative of range positions of the shift lever.

9. The automatic transmission shift range display structure according to claim 1, wherein
the range display includes an indicator upper member having a plurality of windows through which the indicator is visible.

10. The automatic transmission shift range display structure according to claim 9, wherein
the indicator upper member includes indicia disposed adjacent the windows that are indicative of range positions of the shift lever.

11. An automatic transmission shift range display structure comprising:
range display means for visually identifying a plurality of predetermined positions of an automatic mode and a manual mode;

shifting means for selectively moving in a lengthwise direction of a vehicle relative to the range display means to select one of the predetermined positions of the automatic mode and for selectively moving in a widthwise direction of the vehicle relative to the range display means from the automatic mode to select the manual mode that is positioned in the widthwise direction of the vehicle at one of the predetermined positions; and slide means for moving in coordination with the shift lever, the slide means including identification means for identifying a current location of the shifting means corresponding to the predetermined positions of the automatic mode and the manual mode by selectively changing a state of a portion of the range display means that corresponds to the current location of the shifting means, and the identification means moving in the widthwise direction between an automatic mode position and a manual mode position so that the identification means is visible both in the automatic mode and in the manual mode.

* * * * *

UNITED STATES PATENT AND TRADEMARK OFFICE
CERTIFICATE OF CORRECTION

PATENT NO. : 7,201,077 B2  Page 1 of 1
APPLICATION NO. : 10/862350
DATED : April 10, 2007
INVENTOR(S) : Hiroaki Yamamoto et al.

It is certified that error appears in the above-identified patent and that said Letters Patent is hereby corrected as shown below:

On the Title page change the listing of [73] Assignee from

"(73) Assignee: Nissan Motor Co., Ltd., Yokohama (JP)"

to

-- (73) Assignees: Nissan Motor Co., Ltd., Yokohama (JP); Kabushiki Kaisha Tokai-Rika-Denki-Seisakusho, Niwa-gun (JP) --

Signed and Sealed this

Eleventh Day of March, 2008

JON W. DUDAS
*Director of the United States Patent and Trademark Office*